(12) United States Patent  
Ogawa

(10) Patent No.: US 7,861,605 B2
(45) Date of Patent: Jan. 4, 2011

(54) PRESSURE DISTRIBUTION SENSOR UTILIZING ELECTROMAGNETIC COUPLING

(75) Inventor: Yasuji Ogawa, Kurihashi-machi (JP)

(73) Assignee: Newcom, Inc., Ibaraki (JP)

( * ) Notice: Subject to any disclaimer, the term of this patent is extended or adjusted under 35 U.S.C. 154(b) by 233 days.

(21) Appl. No.: 12/373,167

(22) PCT Filed: Jul. 3, 2007

(86) PCT No.: PCT/JP2007/000725

§ 371 (c)(1),
(2), (4) Date: Jan. 9, 2009

(87) PCT Pub. No.: WO2008/007458

PCT Pub. Date: Jan. 17, 2008

(65) Prior Publication Data

US 2010/0005908 A1    Jan. 14, 2010

(30) Foreign Application Priority Data

Jul. 14, 2006   (JP) .............................. 2006-194895

(51) Int. Cl.
  *G01L 1/12* (2006.01)
(52) U.S. Cl. .................................. 73/862.69
(58) Field of Classification Search .............. 73/862.69, 73/862.193, 780, 862.046
  See application file for complete search history.

(56) References Cited

U.S. PATENT DOCUMENTS

| | | | | |
|---|---|---|---|---|
| 3,819,857 A | * | 6/1974 | Inokuchi | 178/18.07 |
| 6,370,965 B1 | * | 4/2002 | Knapp | 73/862.046 |
| 7,343,813 B1 | * | 3/2008 | Harrington | 73/780 |
| 7,703,342 B2 | * | 4/2010 | Ogawa | 73/862.046 |
| 7,800,362 B1 | * | 9/2010 | Ogawa | 324/209 |

FOREIGN PATENT DOCUMENTS

| | | |
|---|---|---|
| DE | 10252862 B3 | 7/2004 |
| JP | 62-31865 Y2 | 8/1987 |
| JP | 2003-337071 | 11/2003 |
| JP | 2005-156474 | 6/2005 |
| JP | 3928976 B1 | 6/2007 |
| WO | WO 2006/106714 A1 | 10/2006 |

* cited by examiner

*Primary Examiner*—Lisa M Caputo
*Assistant Examiner*—Octavia Davis
(74) *Attorney, Agent, or Firm*—Wells St. John PS.

(57) ABSTRACT

A pressure distribution sensor utilizing electromagnetic coupling in which alignment of electromagnetically coupled coils is facilitated, and a force in a slip direction can be detected. The pressure distribution sensor utilizing electromagnetic coupling has a detection surface comprises a plurality of first loop wires (1) arranged in parallel on the same plane, a plurality of second loop wires (2) arranged in parallel on the same plane in the direction perpendicular to the first loop wires (1), and a plurality of third loop wires (3) arranged in parallel on the same plane as the first loop wires. The third loop wires (3) are formed to be connectable to a drive section (10) in a separated manner from the first loop wires. The drive section (10) connected to the first loop wires drives the first loop wires, and a detecting section (20) connected to the second loop wires detects pressure from detection signals based on electromagnetic coupling at the electromagnetic coupling portions from the second loop wires.

17 Claims, 5 Drawing Sheets

PRESSURE DISTRIBUTION SENSOR UTILIZING ELECTROMAGNETIC COUPLING

TECHNICAL FIELD

The present invention relates to a pressure distribution sensor utilizing electromagnetic coupling, and more particularly to a pressure distribution sensor capable of compensating displacement of electromagnetic coupling portions and measuring displacement or force in a slip direction with respect to a detection surface.

BACKGROUND ART

It is known that a pressure distribution sensor utilizes a phenomenon of varying the degree of electromagnetic coupling between two coils depending on the distance between the coils, as disclosed in, e.g., Patent Document 1. In this pressure distribution sensor, a plurality of sensor elements in which a cushion material is placed between coils are arranged in a matrix form to detect the distribution of pressure applied to the sensor elements based on a variation in the degree of electromagnetic coupling. Further, a technique developed by the present inventor and disclosed in Japanese Patent Application Nos. 2005-096580 and 2006-011748 relates to a pressure distribution sensor that has an conductive material disposed adjacent to a plurality of electromagnetically coupled coils and detects the pressure distribution by utilizing a phenomenon of varying the degree of electromagnetic coupling depending on the distance between the conductive material and coils.

Patent Document 1: Japanese Patent Application Kokai Publication No. 2005-156474

DISCLOSURE OF THE INVENTION

Problems to be Solved by the Invention

However, in the conventional pressure distribution sensor utilizing electromagnetic coupling, it has been necessary to perform accurate positioning of two electromagnetically coupled coils. Thus, in the case where a pressure distribution sensor having a large detection surface is produced, achievement of alignment of all coils is attended with much difficulty. Further, such a technique in which a detection surface is formed by overlapping two sheets on each of which a plurality of coils are disposed was therefore hard to achieve.

Further, the conventional pressure distribution sensor utilizing electromagnetic coupling can only detect pressure applied in the vertical direction with respect to a detection surface but cannot detect displacement, direction, or force in a slip direction other than the direction vertical to a detection surface. Therefore, in the case where gait analysis or the like is performed in the sports and medical fields, a satisfactory analysis cannot be achieved since it is impossible to detect a three-dimensional vector such as kicking direction or kicking force.

The present invention has been made in view of the above situation, and an object thereof is to provide a pressure distribution sensor utilizing electromagnetic coupling without positioning between electromagnetically coupled coils and capable of detecting a force in a slip direction.

Means for Solving the Problems

To achieve the above object, according to the present invention, there is provided a pressure distribution sensor utilizing electromagnetic coupling for a detection surface comprising: a plurality of first loop wires arranged in parallel to one another on the same plane; a plurality of second loop wires arranged in parallel to one another on the same plane different from that on which the first loop wires are arranged, and in a direction perpendicular to the first loop wires; a plurality of electromagnetic coupling portions in which the first loop wires and the second loop wires are electromagnetically coupled at the intersections of the first loop wires and the second loop wires, and in which the degree of the electromagnetic coupling varies with pressure applied to the detection surface; a drive section which is connected to one of the first loop wires and the second loop wires, and which drives the loop wires connected thereto; a detection section which is connected to the other of the first loop wires and the second loop wires, and which detects pressure according to detection signals based on the electromagnetic coupling at the electromagnetic coupling portions from the loop wires connected thereto; and a plurality of third loop wires which are arranged in parallel to one another on the same plane as that on which one of the first loop wires and the second loop wires are arranged, each of which is arranged to overlap partly with one of the first and second loop wires that are arranged on the same plane as the third loop wires, and which are connectable to one of the drive section and the detection section in a separated manner from one of the first and second loop wires that are arranged on the same plane as the third loop wires.

The detection section may detect displacement, direction, and/or force in a slip direction with respect to the detection surface other than the vertical direction based on the difference between values of the detection signals obtained when one of the first and second loop wires are driven and when the third loop wires are driven or the difference between values of the detection signals from the other of the first and second loop wires and from the third loop wires.

The third loop wires may be arranged in the same plane as that on which the first loop wires are arranged, and which further comprises a plurality of fourth loop wires arranged in parallel to one another on the same plane as that on which the second loop wires are arranged, each of which is arranged to overlap partly with the second loop wires, and which are connectable to the other of the drive section and the detection section in a separated manner from the second loop wires.

The electromagnetic coupling portions may be provided by the first and second loop wires one of which are formed into a linear shape and the other formed into a coil shape at the intersections of the first and second loop wires; and the third loop wires are arranged on the same plane as that on which one of the first and second loop wires formed into a linear shape are arranged.

The electromagnetic coupling portions may be provided by the first and second loop wires both of which are formed into a coil shape at the intersections of the first and second loop wires.

Both the first and second loop wires may be formed into a linear shape, and the electromagnetic coupling portions may be provided by forming conductive material pieces at the portions adjacent to the intersections of the first and second loop wires.

The pressure distribution sensor may further comprise elastic members for the conductive material pieces which are provided between the portions adjacent to the intersections of the first and second loop wires and conductive material pieces.

The pressure distribution sensor may further comprise a sheet member for the conductive material pieces on which the conductive material pieces are provided.

The pressure distribution sensor may further comprise an elastic sheet member for the conductive material pieces on which the elastic members for the conductive material pieces are provided.

The pressure distribution sensor may further comprise an elastic member for the wires which is provided between the first and second loop wires.

The pressure distribution sensor may further comprise an elastic sheet member for the wires on which the elastic member for the wires is provided.

The pressure distribution sensor may further comprise a first sheet member on which the first loop wires are arranged and a second sheet member on which the second loop wires are arranged, and in which the third loop wires are arranged on one of the first and second sheet members. Here, at least one of the first and second sheet members may have flexibility.

The pressure distribution sensor may further comprise a wiring section for wiring the first, second, and third loop wires at the end portions of the first and second sheet members.

Here, the wiring section may include a substrate on which wiring is patterned for connecting the loop wires.

The first and second sheet members may be made of synthetic resin, and first, second, and third loop wires may be made of aluminum foil.

The third loop wires may have the same shape as that of one of the first and second loop wires and be arranged at a position shifted by ¼ pitch from one of the first and second loop wires.

Advantages of the Invention

The pressure distribution sensor utilizing electromagnetic coupling according to the present invention has advantages that positioning between the coils to be electromagnetically coupled is unnecessary, and assembly and installation of the detection surface are easily made. Further, the pressure distribution sensor can detect force not only in the vertical direction with respect to the detection surface but also in a slip direction and can detect a 3D pressure vector.

BEST MODE FOR CARRYING OUT THE INVENTION

Preferred embodiments for carrying out the present invention will be described below with reference to the accompanying drawings. FIG. 1 is a schematic top plan view for explaining a pressure distribution sensor according to a first embodiment of the present invention. The pressure distribution sensor is mainly constituted by a detection surface constituted by a plurality first loop wires 1, a plurality of second loop wires 2, and a plurality of third loop wires 3, a drive section 10, and a detection section 20. The first loop wires 1 are arranged in the same plane in parallel to one another. Each of the first loop wires 1 is connected to the drive section 10 to thereby serve as a drive coil. The second loop wires 2 are arranged in the same plane in parallel to one another. The arrangement plane of the second loop wires 2 differs from that of the first loop wires 1. The second loop wires 2 are arranged in a direction perpendicular to the first loop wires 1. Each of the second loop wires 2 is connected to the detection section 20 to thereby serve as a detection coil.

The drive section 10 is mainly constituted by a high-frequency oscillator 11, a drive amplifier 12 and a drive wire switch 13, and is sequentially connected to the respective first loop wires 1 to thereby sequentially drive the first loop wires 1.

The detection section 20 is mainly constituted by a detection wire switch 21 and a detection amplifier 22, and is sequentially connected to the second loop wires 2 to thereby sequentially detect an induced current or induced voltage from the second loop wires 2.

The drive section 10 and the detection section 20 are appropriately controlled by a microcomputer or the like and are configured to be able to obtain a desired output. For example, the drive section 10 is first connected to a first one of the first loop wires, and the detection section 20 is sequentially connected to the second loop wires so as to measure output signals at this routine. After that, the drive section 10 is connected to a second one of the first loop wires, and the detection section 20 is sequentially connected to the second loop wires so as to measure output signals at this routine. By repeating the above procedure, output signals at all the positions on the detection surface corresponding to the XY coordinates of intersection points between the first and second loop wires can be measured. The configurations of the drive section 10 and detection section 20 are not limited to the example shown in FIG. 1 but they may have any configuration as long as the drive section can drive the first loop wires and the detection section can detect an induced current or induced voltage from the second loop wires. Further, a configuration in which the first loop wires are used as detection coils and second loop wires are used as drive coils may be possible.

As shown in the figure, in the pressure distribution sensor according to the first embodiment of the present invention, each of the first loop wires 1 is a linear loop wire and each of the second loop wires 2 is a loop wire having rectangular coils, and electromagnetic coupling portions are formed such that electromagnetic coupling is achieved at the intersections of the first and second loop wires. The coupling coefficient of each electromagnetic coupling portion varies depending on the amount of pressure applied to the detection surface. More specifically, an elastic member is provided between the first loop wires and the second loop wires, whereby the distance between the first and second loop wires varies with applied pressure. When pressure is applied to the detection surface, the degree of electromagnetic coupling of each of the electromagnetic coupling portions corresponding to the pressure-applied portions varies. Thus, it is possible to measure the amount of the applied pressure and pressure-applied position by measuring a detected induced current or the like. Although each of the second loop wires has the rectangular coils in the example of FIG. 1, but the present invention is not limited to this, but the coil shape may be formed into any shape such as an arch-like shape or a triangle shape as long as electromagnetic coupling can be achieved.

A plurality of third loop wires 3, which is the most characteristic part of the present invention, are provided in the pressure distribution sensor of the present invention. The third loop wires 3 are arranged in the same plane in parallel to one another. The arrangement plane of the third loop wires 3 is the same as that of the first loop wires 1. The third loop wires 3 and first loop wires 1 are arranged in parallel to each other such that they partly overlap each other. The third loop wires 3 are connected to the drive section 10 in a separated manner from the first loop wires 1.

The first loop wires 1 are linearly arranged in the column direction of the drawing, so that an electromagnetic coupling state in the pressure distribution sensor shown in FIG. 1 is not influenced by the displacement in the column direction, considering the positional relationship between the first and second loop wires 1 and 2. However, if the first and second loop wires 1 and 2 are displaced from each other in the row direction, the electromagnetic coupling portions to be formed at the intersections of the first loop wires 1 and the coil-shaped second loop wires 2 are displaced from their proper positions, which may result in zero electromagnetic coupling. Therefore, in the pressure distribution sensor according to the present invention, the third loop wires 3 are arranged in parallel to the first loop wires 1. By doing this, even if there occurs displacement in the row direction, either the first loop wires 1 or the third loop wires 3 are coupled to the second loop wires 2. Thus, it can be said that, in the pressure distribution sensor, any displacement between the first and second loop wires 1 and 2 does not prevent the pressure distribution detection. That is, the drive section 10 is connected to the first loop wires 1 and the third loop wires 3 in a switching manner to sequentially drive the first loop wires 1 and the third loop wires 3, and the sum of the absolute values or the square-root of the sum of squares of the coupling coefficient is used while driving the respective loop wires, making it possible to detect the pressure distribution without being influenced by the displacement. The switch between the first and third loop wires 1 and 3 may be made successively or alternately. Further, a configuration may be adopted in which only the first loop wires 1 are used for detection usually and, if necessary, the third loop wires 3 are used. Although a configuration in which the first loop wires 1 and the third loop wires 3 are physically switched by using the switch has been described, any configuration may be adopted concerning the switch mechanism as long as the first loop wires 1 and the third loop wires 3 are driven in a separated manner. For example, a configuration may be adopted in which different drive frequencies are used to drive the first loop wires 1 and the third loop wires 3 simultaneously and the detection side detects the pressure distribution according to the used frequency.

Further, based on the difference between the values of the detection signals obtained when the drive section 10 is connected to the third loop wires 3 and when the drive section 10 is connected to the first loop wires 1, the detection section 20 can detect displacement, direction, and/or force in a slip direction other than the direction vertical to the detection surface, in particular, displacement, direction, and/or force in the row direction since an electromagnetic coupling state in the pressure distribution sensor according to the first embodiment is not influenced by the displacement in the column direction. That is, by switching between the first loop wires 1 and the third loop wires 3, different detection signals can be obtained for the same pressure distribution. Thus, by using the difference between the detection signals, it is possible to detect displacement, direction, and/or force in a slip direction concerning the first and second loop wires 1 and 2.

In the pressure distribution sensor according to the first embodiment of the present invention, the first loop wires 1 are formed into a linear shape, the second loop wires 2 are formed into a coil shape, and the third loop wires 3 are so arranged as to partly overlap the first loop wires 1. However, the present invention is not limited to this. For example, a configuration may be adopted in which the first loop wires 1 are formed into a coil shape, the second loop wires 2 are formed into a linear shape, and the third loop wires 3 are so arranged as to partly overlap the second loop wires 2. That is, the third loops wires 3 may be provided on either the first loop wires 1 side or the second loop wires 2 side as long as the third loop wires 3 are so arranged as to partly overlap the first loop wires 1 or the second loop wires 2 at a position shifted from the first loop wires 1 or the second loop wires 2 in the direction in which displacement can occur.

Further, in the example of FIG. 1, the plurality of third loop wires 3 have the same shape as that of the first loop wires 1 and are arranged at a position shifted by ¼ pitch from the first loop wires 1. This arrangement provides the maximum effect with the minimum number of coils when the width of the respective loop wires and the interval between them are made equal. However, the present invention is not limited to this. For example, in the case where it is necessary to compensate large displacement or to compensate displacement more finely, the arrangement interval between the third loop wires 3 may be made smaller to increase the overlapping area between the first and third loop wires 1 and 3. Further, as to the first loop wires 1 or the second loop wires 2, the width and the interval of the respective loop wires need not be made equal to each other, and they may be appropriately set according to the resolution and the like of the detection surface.

Since the pressure distribution sensor according to the present invention has a configuration capable of compensating displacement as described above, accurate positioning between the first and second loop wires 1 and 2 need not be performed. Thus, for example, a configuration may be possible in which sheet members are used to constitute the detection surface. More specifically, by preparing sheet members on which the first and second loop wires 1 and 2 are arranged respectively and overlapping them with each other, it is possible to easily constitute the detection surface on the spot. FIG. 2 is a view schematically explaining an example in which the detection surface of the pressure distribution sensor according to the first embodiment is constituted by sheet members. The detection surface of the pressure distribution sensor shown in FIG. 2 is obtained by disposing a first sheet member 100 and a second sheet member 200 in a direction perpendicular to each other with an elastic sheet 300 interposed therebetween. The first and third loop wires are arranged on the first sheet member 100. The second loop wires are arranged on the second sheet member 200. The accurate positioning between the first and second sheet members 100 and 200 need not be performed, so that in the case where, for example, the pressure distribution sensor is installed on the entire surface of a room floor, the detection surface can easily be obtained on the spot simply by arranging the sheet members. In the illustrated figure, two parallel-arranged rectangular first sheet members and two parallel-arranged rectangular second sheet members are used to constitute a wide detection surface. However, the number of sheet members to be used is not limited to this, but may be increased or decreased if necessary.

The sheet member can be constituted as a roll sheet member on which continuous wiring patterns obtained by laminating loop wires formed of aluminum foil or the like with synthetic resin such as PET are formed. The roll sheet member is cut according to the size of a floor on which the pressure distribution sensor is installed. Then the second sheet member 200 is placed on the floor, the elastic sheet 300 is placed on the second sheet member 200, and finally the first sheet member 100 is placed on the elastic sheet 300. According to the present invention, accurate positioning need not be performed at this time, so that installation can be completed very easily. Further, when the sheet member is formed of a PET material, the sheet member has flexibility, so that separation between the electromagnetic coupling portion and its adjacent portion can be ensured. A controller 400 including the drive section, detection section and the like is connected to the detection surface thus obtained to thereby constitute the pressure distribution sensor.

The case where the sheet member is constituted as the roll sheet member will be described more specifically. FIG. 3 is a top plan view of the first sheet member 100 on which wiring patterns for the first and third loop wires are formed. As shown in the figure, the first sheet member 100 is constituted as a roll sheet on which linear wiring patterns 110 are formed. For example, eight linear wiring patterns 110 are patterned on the first sheet member 100. The number of wiring patterns to be patterned is not limited to this, but may be increased or decreased if necessary.

FIG. 4 is a top plan view of the second sheet member 200 on which wiring patterns for the second loop wires are formed. As shown in FIG. 4, the second sheet member 200 is constituted as a roll sheet on which coil shaped wiring patterns are formed. For example, four rectangular wiring patterns 210 for constituting two coil shaped loop wires are patterned on the second sheet member 200. The number of wiring patterns to be patterned on the second sheet member 200 is not limited to this, but may be increased or decreased if necessary.

When the above sheet members are used to obtain the wiring patterns as shown in FIG. 1, a method of directly connecting lead wires or the like to the sheet members may be adopted. Alternatively, however, connection substrates as described below may be used. In this case, the first and second sheet members 100 and 200 are cut into a predetermined size, respectively. Then, connection holes 111, 112, 211, and 212 are formed in the obtained first and second sheet members 100 and 200 at both ends thereof, and a substrate for short-circuiting and a substrate for switching, on which wiring patterns corresponding to the pitch of the connection holes are previously formed, are used to connect wires at the end portions of the respective sheet members.

FIG. 5 is a top plan view showing a substrate for short-circuiting of the loop wires of the first sheet member 100. The substrate for short-circuiting has a short-circuit wiring for connecting the first loop wires 1 arranged on the same surface in a desired manner and a short-circuit wiring for connecting a desired pair of the third loop wires 3 in a desired manner such that the first and third loop wires 1 and 3 partly overlap each other. As shown in the figure, connection holes 113 are formed in the substrate for short-circuiting. The positions of the connection holes 113 and those of the connection holes 111 of the first sheet member 100 are made to coincide with each other, and the substrate for short-circuiting and the first sheet member 100 are fit together by means of screws passing through, for example, toothed washers, whereby one end of the first and third loop wires 1 and 3 is formed.

For the other end opposite to the end at which the substrate for short-circuiting of the loop wires of the first sheet member 100 are provided, a substrate for switching is used. FIG. 6 is a top plan view showing a substrate for switching of the loop wires of the first sheet member 100. The substrate for switching has a configuration capable of connecting one ends of the first loop wires 1 to the ground and other ends thereof to the controller 400 through the switch 13 and capable of connecting one ends of the third loop wires 3 to the ground and other ends thereof to the controller 400 through the switch 13. With this configuration, the wiring patterns as shown in FIG. 1 can be obtained. As shown in FIG. 6, connection holes 114 are formed in the substrate for switching. The positions of the connection holes 114 and those of the connection holes 112 of the first sheet member 100 are made to coincide with each other, and the substrate for switching and the first sheet member 100 are fit together by means of screws passing through, for example, toothed washers, whereby the other end of the first and third loop wires 1 and 3 is formed. Although the switch 13 is disposed on the substrate in the illustrated example, the present invention is not limited thereto, and the switch 13 may be included in the controller 400.

At both end portions of the second sheet member 200, a substrate for short-circuiting and a substrate for switching shown in FIGS. 7 and 8 are provided. FIG. 7 is a top plan view showing a substrate for short-circuiting of the loop wires of the second sheet member 200. The substrate for short-circuiting has a short-circuit wiring for connecting the second loop wires 2 arranged on the same surface in a desired manner. FIG. 8 is a top plan view showing a substrate for switching of the loop wires of the second sheet member 200. The substrate for switching has a configuration capable of connecting one ends of the second loop wires 2 to the ground and other ends thereof to the controller 400 through the switch 21. With this configuration, the wiring patterns as shown in FIG. 1 can be obtained. As shown in FIG. 7, connection holes 213 are formed in the substrate for short-circuiting. The positions of the connection holes 213 and those of the connection holes 211 of the second sheet member 200 are made to coincide with each other, and the substrate for short-circuiting and the second sheet member 200 are fit together by means of screws passing through, for example, toothed washers, whereby one end of the second loop wires 2 is formed. As shown in FIG. 8, connection holes 214 are formed in the substrate for switching. The positions of the connection holes 214 and those of the connection holes 212 of the second sheet member 200 are made to coincide with each other, and the substrate for switching and the second sheet member 200 are fit together by means of screws passing through, for example, toothed washers, whereby the other end of the second loop wires 2 is formed. As in the case of the switch 13, the switch 21 may be included in the controller 400.

Each of the substrates shown in FIGS. 5 to 8 is so constructed as to establish one-to-one correspondence with the wiring patters shown in FIGS. 3 and 4. However, the present invention is not limited to this. For example, two sheet members are used for one substrate, or two or more substrates are used for one sheet member.

Since accurate positioning between the first and second loop wires 1 and 2 need not be performed in the pressure distribution sensor according to the present invention, it is possible to easily combine sheet-shaped wirings for arrangement. As a matter of course, calibration and the like can be appropriately performed before actual measurement of pressure distribution.

A pressure distribution sensor according to a second embodiment of the present invention will next be described with reference to FIG. 9. FIG. 9 is a schematic top plan view for explaining a pressure distribution sensor according to a second embodiment of the present invention. In FIG. 9, the same reference numerals as those in FIG. 1 denote substantially the same parts, and the descriptions thereof will be omitted here. In the first embodiment, the detection surface is constituted by the linear first loop wires and the coil-shaped second loop wires, and they are directly electromagnetically coupled to each other, while in the second embodiment, both the first and second loop wires are formed into a linear shape, and conductive material pieces are formed adjacent to the portions at which the linear first and second loop wires cross each other to thereby constitute electromagnetic coupling portions at which the linear first and second loop wires are indirectly electromagnetically coupled. Further, although displacement in the row direction can be detected in the first embodiment, a pressure distribution sensor according to the second embodiment can be configured to be able to detect displacement not only in the row direction but also in the column direction and, further, in a 3D direction.

With reference to FIG. 9, a configuration of the pressure distribution sensor will be described more particularly below. In the detection surface of the pressure distribution sensor according to the second embodiment, the linear second loop wires 2 are arranged to cross at right angles the linear first loop wires 1, and the conductive material pieces 5 are provided adjacent to the portions at which the first and second loop wires 1 and 2 cross each other, whereby the electromagnetic coupling portions at which the first and second loop wires 1 and 2 are indirectly electromagnetically coupled are constituted.

Further, as shown in FIG. 9, the third loop wires 3 are so arranged as to partly overlap the first loop wires 1. Further, in the second embodiment, a plurality of fourth loop wires 4 are so arranged on the same plane as the second loop wires 2 as to partly overlap the second loop wires 2. The fourth loop wires 4 are connected to a detection section 20 in a separated manner from the second loop wires 2.

The portions adjacent to the intersections of the first and second loop wires 1 and 2 at which the conductive material pieces are provided are not limited to the portions just above the intersections, but the conductive material pieces may be provided adjacent to the portions just above the intersections between the center line of a pair of the first and third loop wires and the center line of a pair of the second and fourth loop wires, as shown in FIG. 9.

As shown in FIG. 9, in the pressure distribution sensor according to the second embodiment, the conductive material pieces 5 are provided adjacent to the portions at which the first and second loop wires 1 and 2 cross each other to constitute the electromagnetic coupling portions at which the first and second loop wires 1 and 2 are indirectly electromagnetically coupled. At each of the electromagnetic coupling portions, the coupling coefficient is changed when pressure is applied to the detection surface. More specifically, the conductive material pieces 5 are provided on the detection surface through elastic members 6 and thereby the distance between the conductive material pieces 5 and the first and second loop wires are changed in accordance with the amount of pressure. Thus, when pressure is applied to the detection surface, the degree of electromagnetic coupling of the electromagnetic coupling portion corresponding to the pressure-applied portion varies. Thus, the amount of the applied pressure and the position at which the pressure has been applied can be detected by measuring a detected induced current or the like.

In the pressure distribution sensor according to the second embodiment, the plurality of the third loop wires 3 and the plurality of the fourth loop wires 4 are arranged. The drive section 10 is switchably connected to the first loop wires 1 and the third loop wires 3, and the detection section 20 is switchably connected to the second loop wires 2 and the fourth loop wires 4.

In the pressure distribution sensor according to the second embodiment, the conductive material pieces 5 provided on the detection surface through the elastic members 6 are configured to be movable not only in the vertical direction but also in a slip direction with respect to the detection surface. FIG. 10 is a cross-sectional view showing a part of the detection surface in the pressure distribution sensor according to the second embodiment. As shown therein, the elastic members 6 are provided for respective conductive material pieces 5 independently of one another and thereby the conductive material pieces 5 can be moved in arbitrary directions independently of one another. Since the third loop wires 3 are arranged in parallel to the first loop wires 1, one of the first and third loop wires 1 and 3 are inevitably coupled to the second loop wires 2 even displacement occurs in the row direction in FIG. 9. That is, the displacement in the row direction does not prevent the pressure distribution detection. Further, since the fourth loop wires 4 are arranged in parallel to the second loop wires 2, one of the second and fourth loop wires 2 and 4 are inevitably coupled to the first loop wires 1 even displacement occurs in the column direction in FIG. 9. That is, the displacement in the column direction does not prevent the pressure distribution detection. The drive section 10 is connected to the first loop wires 1 and the third loop wires 3 in a switching manner to sequentially drive the first loop wires 1 and the third loop wires 3, and the detection section 20 is connected to the second loop wires 2 and the fourth loop wires 4 in a switching manner to perform detection, and the sum of the absolute values or the square-root of the sum of squares of the coupling coefficient is used at the drive time and the detection time of the respective loop wires, making it possible to detect the pressure distribution without being influenced by the displacement. In the second embodiment as well, the switch mechanism for the first and third loop wires 1 and 3 is not limited to that in which they are physically switched by using a switch, but any configuration may be adopted as long as the first loop wires 1 and the third loop wires 3 are driven in a separated manner. For example, a configuration may be adopted in which different drive frequencies are used to drive the first loop wires and the third loop wires simultaneously and the detection side detects the pressure distribution according to the used frequency. Similarly, the switch mechanism for the second and fourth loop wires 2 and 4 is not limited to that in which they are physically switched by using a switch, but any configuration may be adopted as long as the second loop wires 2 and the fourth loop wires 4 are driven in a separated manner. For example, a configuration may be adopted in which a plurality of detection circuits are connected to the second loop wires 2 and the fourth loop wires 4 to simultaneously detect the pressure distribution in a separated manner from one another.

Further, the detection section 20 can detect displacement, direction, and/or force in a slip direction other than the vertical direction with respect to the detection surface based on the difference between the values of the detection signals obtained when the drive section 10 is connected to the third loop wires 3 and when the drive section 10 is connected to the first loop wires 1 and difference between the values of the detection signals obtained when the detection section 20 is connected to the fourth loop wires 4 and when the detection section 20 is connected to the second loop wires 2. The displacement in the slip direction can be detected not only as a 2D vector but also as a 3D vector.

A procedure of detecting a 3D vector will specifically be described below. Symbols ai, bi, ci, and di used in the following description correspond to connection terminals of the fourth loop wires 4, the second loop wires 2, the first loop wires 1, and the third loop wires 3 shown in FIG. 9, respectively, where i is a natural number from 1 to n and indicates i-th loop wire. Further, the amplitudes of output signals obtained when the drive section or the detection section is connected to the respective terminals are assumed to be $A_{aci}$, $A_{adi}$, $A_{bci}$, and $A_{bdi}$.

The switch 13 is used to connect the drive section 10 to the connection terminal c1 and the switch 21 is used to connect the detection section 20 to the connection terminal a1 to thereby detect the output signal $A_{ac1}$. Then, the switch 21 is used to connect the detection section 20 to the connection terminal b1 to thereby detect the output signal $A_{bc1}$. Subsequently, the switch 13 is used to connect the drive section 10 to the connection terminal d1 and the switch 21 is used to connect the detection section 20 to the connection terminal a1 to thereby detect the output signal $A_{ad1}$. Further, the switch 21 is used to connect the detection section 20 to the connection terminal b1 to thereby detect the output signal $A_{db1}$. A series of the above steps are repeated until i reaches n to thereby obtain the output signals corresponding to all the loop wires arranged.

Using the output signals thus obtained, pressure zi, x-displacement Δxi, and y-displacement Δyi can be represented by the following equations.

$$z_i = A_{aci} + A_{adi} + A_{bci} + A_{bdi} \quad \text{[Equation 1]}$$

$$\Delta x_i = \frac{(A_{aci} + A_{bci}) - (A_{adi} + A_{bdi})}{z_i} \quad \text{[Equation 2]}$$

$$\Delta y_i = \frac{(A_{aci} + A_{adi}) - (A_{bci} + A_{bdi})}{z_i} \quad \text{[Equation 3]}$$

According to the Equations 1 to 3, pressure (displacement in z-direction) and displacement in x- and y-directions at each coordinate position can be detected and, based on the three values, a 3D vector can be obtained. The order in which the output signals are obtained, that is, the order of switching of the loop wires by means of the switch is not particularly limited to that described above, but the switching may be performed in any order as long as the respective output signals can be obtained. Further, in the above example, obtaining of the output signals corresponding to all the pairs of the loop wires is performed first, and then inputting of the obtained values into the formulas is made. Alternatively however, respective outputs may be input into the formulas for measurement for each i-th pair of loop wires.

In the second embodiment shown in FIG. 9, the conductive material pieces are provided to be freely movable independently of one another. However, the present invention is not limited to this, but a configuration may be adopted in which the conductive material pieces can be moved only in the row direction. In this case, the fourth loop wires for detecting displacement in the column direction become unnecessary. By contraries, in the case where the conductive material pieces may be made movable only in the column direction, the third loop wires for detecting displacement in the row direction become unnecessary. As described above, the configuration of the pressure distribution sensor according to the present invention may be changed according to an object to be detected.

When the conductive material pieces 5 are made to be freely movable independently of one another, they are preferably made movable in a slip direction with respect to the detection surface independently of one another in addition to the vertical direction. However, an elastic sheet member obtained by forming an elastic member into a sheet may be used. Further, the conductive material pieces 5 may be constituted as a conductive material sheet member obtained by disposing a plurality of conductive materials 5 on a sheet member.

In the second embodiment, the distance between the first loop wires and the second loop wires is fixed, and a variation in the degree of electromagnetic coupling can be detected by detecting a variation in the distance between the conductive material pieces and the loop wires. That is, an elastic material need not be provided between the first and second loop wires. However, the present invention is not limited to this, but an elastic member may be provided between the first and second loop wires.

In the first embodiment, the first loop wires 1 are formed into a linear shape and the second loop wires 2 are formed into a coil shape. In the second embodiment, both the first and second loop wires 1 and 2 are formed into a linear shape, and the conductive material pieces are used to constitute electromagnetic coupling portions at which the first and second loop wires are indirectly electromagnetically coupled. However, the present invention is not limited to this, but both the first and second loop wires may be formed into a coil shape to constitute electromagnetic coupling portions at which the first and second loop wires are directly electromagnetically coupled. In this case, the third loop wires 3 are also formed into a coil shape and so arranged on the same plane as the first loop wires 1 as to partly overlap the first loop wires 1, and the fourth loop wires 4 may also be formed into a coil shape and so arranged on the same plane as the second loop wires 2 as to partly overlap the second loop wires 2.

Further, also in the second embodiment, the pressure distribution sensor may be constituted by using the sheet member as shown in FIG. 2.

The pressure distribution sensor utilizing electromagnetic coupling according to the present invention is not limited to the configurations shown in the drawings, but may be variously modified without departing from the spirit and scope of the invention.

EXPLANATION OF REFERENCE SYMBOLS

Figure 1:
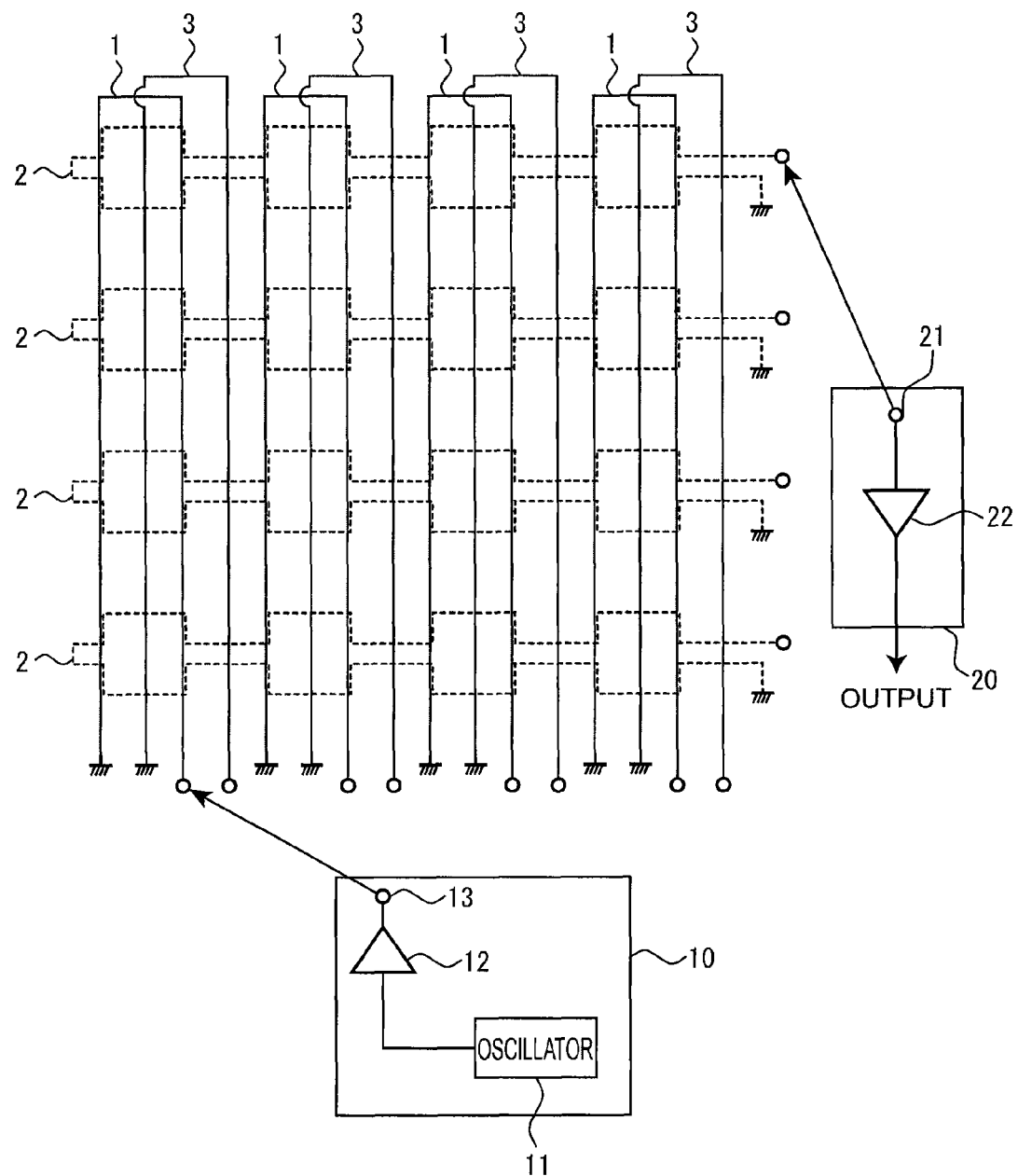
FIG. 1 is a schematic top plan view for explaining a pressure distribution sensor according to a first embodiment of the present invention.
Figure 2:
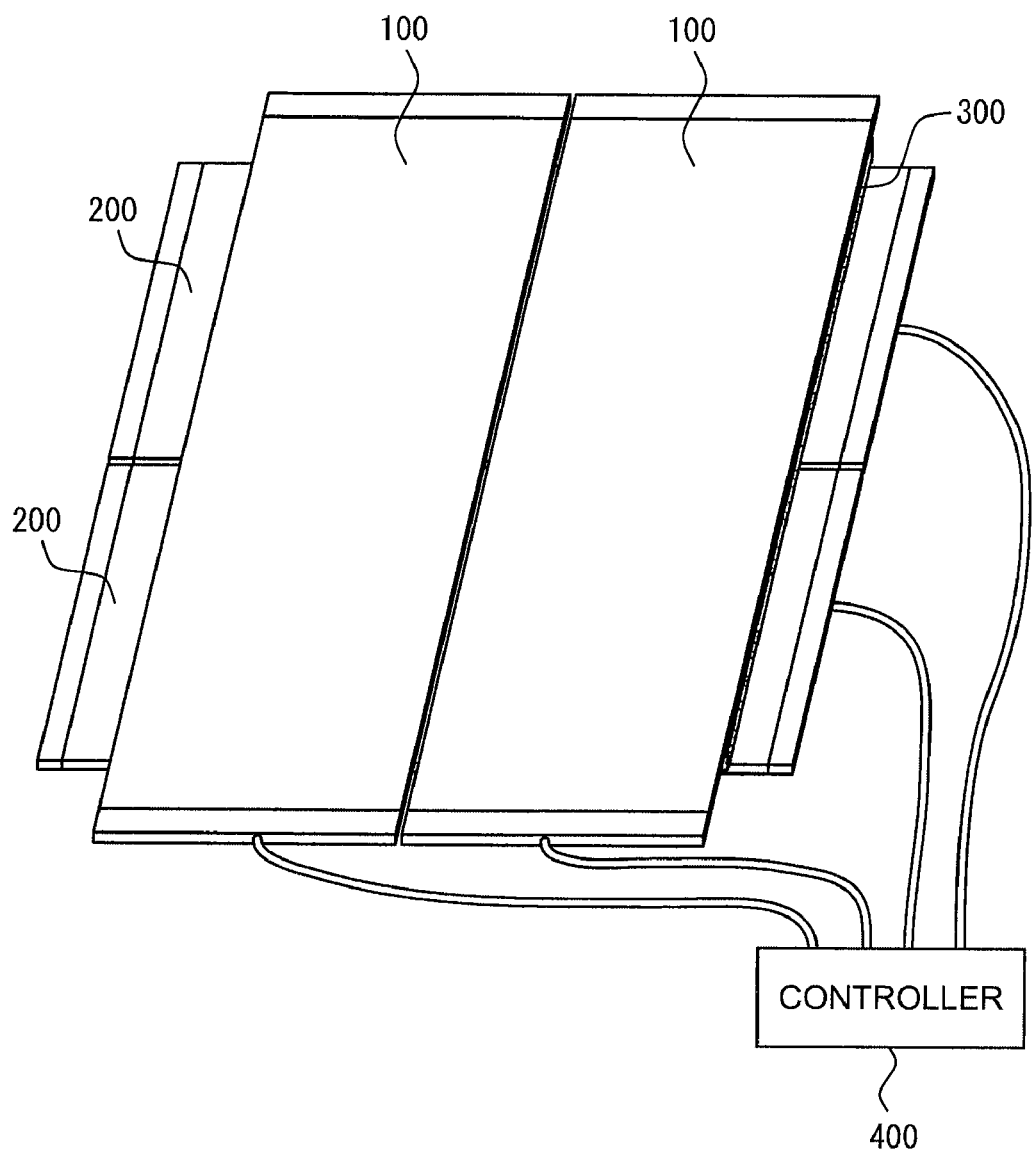
FIG. 2 is a schematic view explaining an example in which a detection surface of the pressure distribution sensor according to the first embodiment of the present invention is constituted by sheet members.
Figure 3:
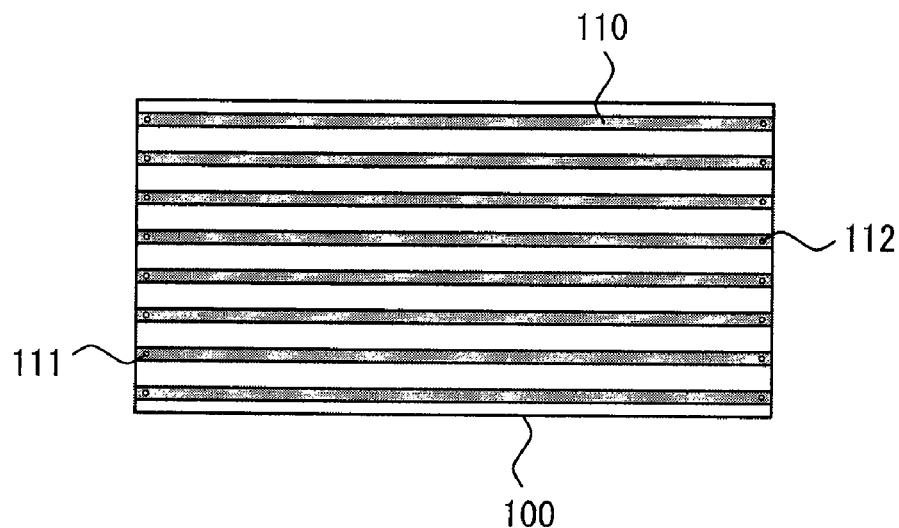
FIG. 3 is a top plan view of the first sheet member on which wiring patterns for first and third loop wires are formed.
Figure 4:
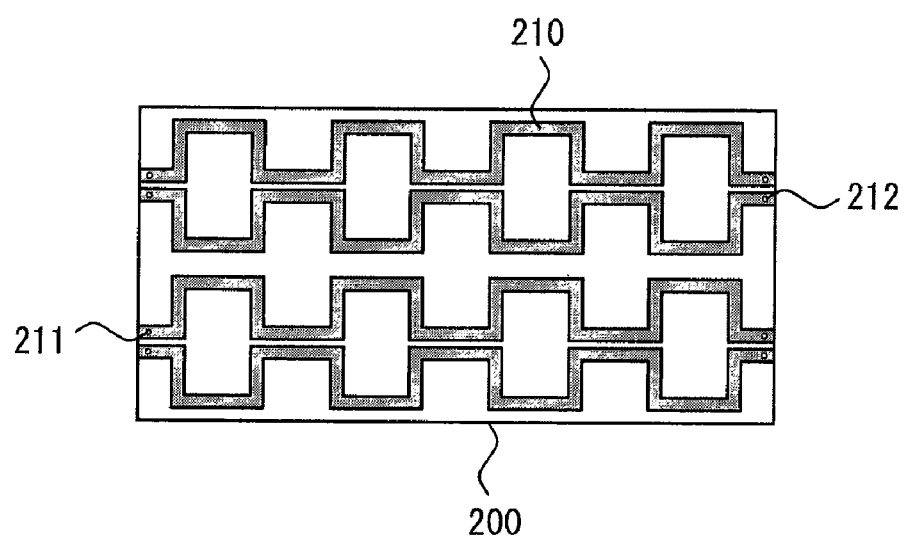
FIG. 4 is a top plan view of the second sheet member on which wiring patterns for the second loop wires are formed.
Figure 5:
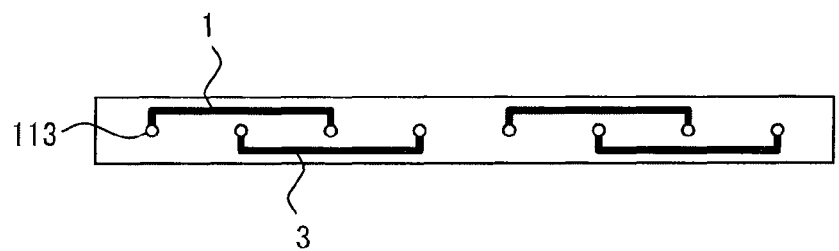
FIG. 5 is a top plan view showing a substrate for short-circuiting of the loop wires of the first sheet member.
Figure 6:
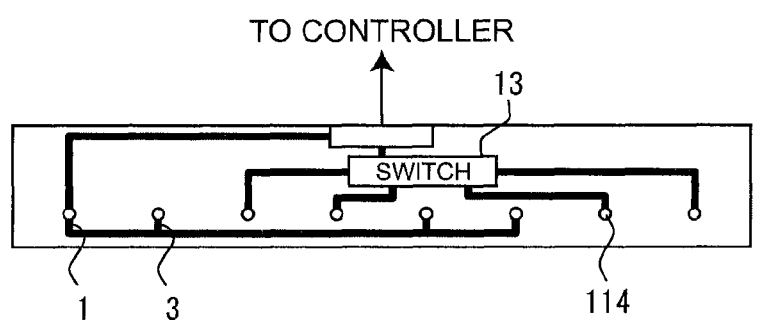
FIG. 6 is a top plan view showing a substrate for switching of the loop wires of the first sheet member.
Figure 7:
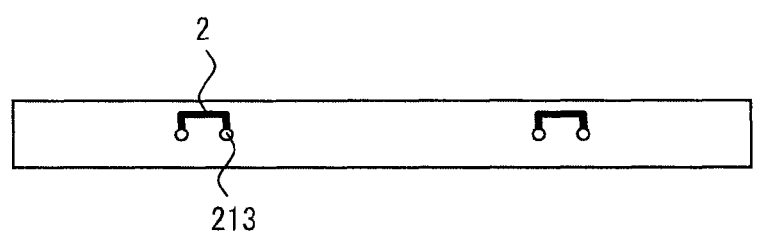
FIG. 7 is a top plan view showing a substrate for short-circuiting of the loop wires of the second sheet member.
Figure 8:
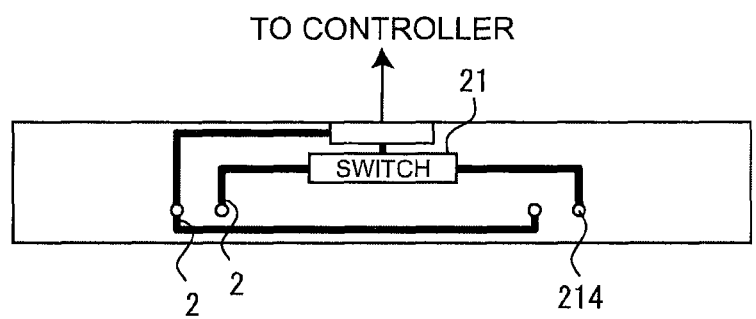
FIG. 8 is a top plan view showing a substrate for switching of the loop wires of the second sheet member.
Figure 9:
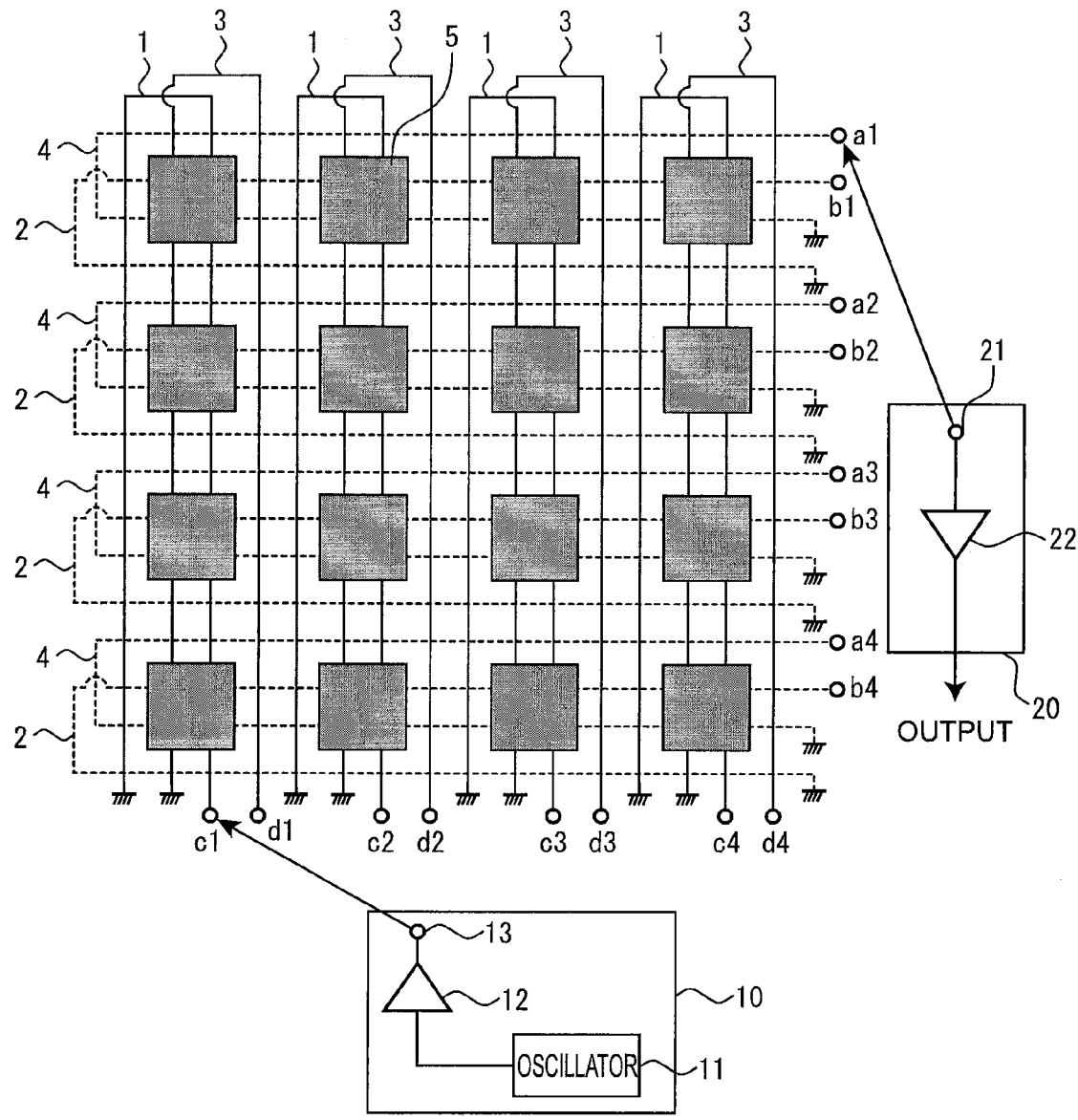
FIG. 9 is a schematic top plan view for explaining a pressure distribution sensor according to a second embodiment of the present invention.
Figure 10:
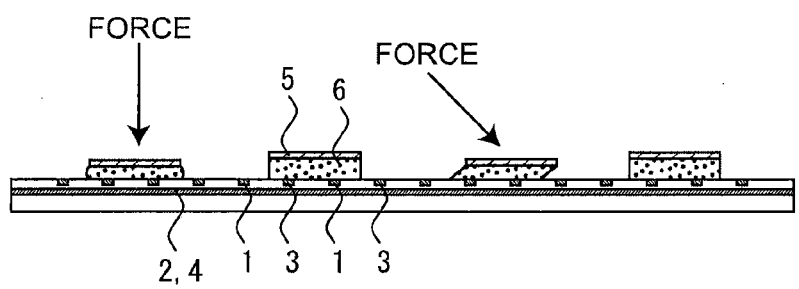
FIG. 10 is a cross-sectional view showing a part of the detection section in the pressure distribution sensor according to the second embodiment.

1: First loop wire
2: Second loop wire
3: Third loop wire
4: Fourth loop wire
5: Conductive material piece
6: Elastic member
10: Drive section
11: High-frequency oscillator
12: Drive amplifier
13: Drive wire switch
20: Detection section
21: Detection wire switch
22: Detection amplifier
100: First sheet member
110: Wiring pattern 111 to 114: Connection hole
200: Second sheet member
210: Wiring pattern
211 to 214: Connection hole
300: Elastic sheet
400: Controller

The invention claimed is:

1. A pressure distribution sensor utilizing electromagnetic coupling for a detection surface comprising:
- a plurality of first loop wires arranged in parallel to one another on the same plane;
- a plurality of second loop wires arranged in parallel to one another on the same plane different from that on which the first loop wires are arranged, and in a direction perpendicular to the first loop wires;
- a plurality of electromagnetic coupling portions in which the first loop wires and the second loop wires are electromagnetically coupled at the intersections of the first loop wires and the second loop wires, and in which the degree of the electromagnetic coupling varies with pressure applied to the detection surface;
- a drive section which is connected to one of the first loop wires and the second loop wires, and which drives the loop wires connected thereto;
- a detection section which is connected to the other of the first loop wires and the second loop wires, and which detects pressure according to detection signals based on the electromagnetic coupling at the electromagnetic coupling portions from the loop wires connected thereto; and
- a plurality of third loop wires which are arranged in parallel to one another on the same plane as that on which one of the first loop wires and the second loop wires are arranged, each of which is arranged to overlap partly with one of the first and second loop wires that are arranged on the same plane as the third loop wires, and which are connectable to one of the drive section and the detection section in a separated manner from one of the first and second loop wires that are arranged on the same plane as the third loop wires.

2. The pressure distribution sensor according to claim 1, in which the detection section detects displacement, direction, and/or force in a slip direction with respect to the detection surface other than the vertical direction based on the difference between values of the detection signals obtained when one of the first and second loop wires are driven and when the third loop wires are driven or the difference between values of the detection signals from the other of the first and second loop wires and from the third loop wires.

3. The pressure distribution sensor according to claim 1, in which
- the third loop wires are arranged in the same plane as that on which the first loop wires are arranged, and
- which further comprises a plurality of fourth loop wires arranged in parallel to one another on the same plane as that on which the second loop wires are arranged, each of which is arranged to overlap partly with the second loop wires, and which are connectable to the other of the drive section and the detection section in a separated manner from the second loop wires.

4. The pressure distribution sensor according to claim 3, in which the electromagnetic coupling portions are provided by the first and second loop wires both of which are formed into a coil shape at the intersections of the first and second loop wires.

5. The pressure distribution sensor according to claim 1, in which the electromagnetic coupling portions are provided by the first and second loop wires one of which are formed into a linear shape and the other formed into a coil shape at the intersections of the first and second loop wires; and the third loop wires are arranged on the same plane as that on which one of the first and second loop wires formed into a linear shape are arranged.

6. The pressure distribution sensor according to claim 1, in which
- both the first and second loop wires are formed into a linear shape, and
- the electromagnetic coupling portions are provided by forming conductive material pieces at the portions adjacent to the intersections of the first and second loop wires.

7. The pressure distribution sensor according to claim 6, further comprising elastic members for the conductive material pieces which are provided between the portions adjacent to the intersections of the first and second loop wires and conductive material pieces.

8. The pressure distribution sensor according to claim 7, further comprising an elastic sheet member for the conductive material pieces on which the elastic members for the conductive material pieces are provided.

9. The pressure distribution sensor according to claim 6, further comprising a sheet member for the conductive material pieces on which the conductive material pieces are provided.

10. The pressure distribution sensor according to claim 1, further comprising an elastic member for the wires which is provided between the first and second loop wires.

11. The pressure distribution sensor according to claim 10, further comprising an elastic sheet member for the wires on which the elastic member for the wires is provided.

12. The pressure distribution sensor according to claim 1, further comprising a first sheet member on which the first loop wires are arranged and a second sheet member on which the second loop wires are arranged, and in which the third loop wires are arranged on one of the first and second sheet members.

13. The pressure distribution sensor according to claim 12, in which at least one of the first and second sheet members has flexibility.

14. The pressure distribution sensor according to claim 12, further comprising a wiring section for wiring the first, second, and third loop wires at the end portions of the first and second sheet members.

15. The pressure distribution sensor according to claim 14, in which the wiring section includes a substrate on which wiring is patterned for connecting the loop wires.

16. The pressure distribution sensor according to claim 12, in which the first and second sheet members are made of synthetic resin, and first, second, and third loop wires are made of aluminum foil.

17. The pressure distribution sensor according to claim 1, in which the third loop wires have the same shape as that of one of the first and second loop wires and are arranged at a position shifted by ¼ pitch from one of the first and second loop wires.

* * * * *

UNITED STATES PATENT AND TRADEMARK OFFICE
CERTIFICATE OF CORRECTION

PATENT NO. : 7,861,605 B2
APPLICATION NO. : 12/373167
DATED : January 4, 2011
INVENTOR(S) : Yasuji Ogawa Page 1 of 1

It is certified that error appears in the above-identified patent and that said Letters Patent is hereby corrected as shown below:

In the Specification

Column 1 please insert the following paragraph above line 5:
--This is a 35 U.S.C. §371 application of and claims priority to International Application No. PCT/JP2007/000725, which was filed on July 3, 2007, and which claims priority to Japanese Patent Application No. 2006-194895, which was filed on July 14, 2006, and the teachings of all the applications are incorporated by reference.--

Column 10, line 61 – Replace "signal $A_{be1}$" with --signal $A_{bc1}$--

Column 10, line 67 – Replace "signal $A_{db1}$" with --signal $A_{bd1}$--

Signed and Sealed this
Twenty-fourth Day of September, 2013

Teresa Stanek Rea
*Deputy Director of the United States Patent and Trademark Office*